US009376871B2

(12) United States Patent
Levie et al.

(10) Patent No.: US 9,376,871 B2
(45) Date of Patent: Jun. 28, 2016

(54) MODIFIED TUBULAR

(71) Applicant: ANTELOPE OIL TOOL & MFG. CO., LLC, Mineral Wells, TX (US)

(72) Inventors: David E. Y. Levie, Kastanienbaum (CH); Richard Ronald Baynham, Marina di Ravenna (IT)

(73) Assignee: ANTELOPE OIL TOOL & MFG. CO., Mineral Wells, TX (US)

( * ) Notice: Subject to any disclaimer, the term of this patent is extended or adjusted under 35 U.S.C. 154(b) by 0 days.

(21) Appl. No.: 14/374,442

(22) PCT Filed: Apr. 9, 2013

(86) PCT No.: PCT/EP2013/057416
§ 371 (c)(1),
(2) Date: Jul. 24, 2014

(87) PCT Pub. No.: WO2014/037125
PCT Pub. Date: Mar. 13, 2014

(65) Prior Publication Data
US 2014/0367085 A1    Dec. 18, 2014

(30) Foreign Application Priority Data

Sep. 5, 2012    (GB) .................................... 1215868.9

(51) Int. Cl.
*E21B 17/10* (2006.01)
*B29C 70/06* (2006.01)
(Continued)

(52) U.S. Cl.
CPC ....... *E21B 17/1078* (2013.01); *B29C 45/14786* (2013.01); *B29C 45/1671* (2013.01); *B29C 70/023* (2013.01); *B29C 70/06* (2013.01); *B29C 70/68* (2013.01); *B32B 37/1284* (2013.01);

(Continued)

(58) Field of Classification Search
CPC ............................ E21B 17/10; E21B 17/1078
See application file for complete search history.

(56) References Cited

U.S. PATENT DOCUMENTS 4,146,060 A    3/1979  Garrett
4,634,314 A *  1/1987  Pierce .................. 405/224.2
(Continued)

FOREIGN PATENT DOCUMENTS

EP    0 701 041      3/1996
GB    2358418        7/2001
(Continued)

OTHER PUBLICATIONS

International Search Report dated Jul. 2, 2014 from International Application No. PCT/EP2013/057416, pp. 1-6.
(Continued)

*Primary Examiner* — William P Neuder
(74) *Attorney, Agent, or Firm* — MH2 Technology Law Group, LLP

(57) ABSTRACT

A positioning member (11) for a tubular (10) is formed using a prefabricated fiber-reinforced resin shell (1) positioned upon a surface of the tubular and bonded to provide a protrusion upon the surface of the tubular. In a disclosed method a fiber-reinforced resin shell (1) is secured to an external surface of a tubular (10) thereby enclosing a cavity between the shell (1) and the surface of the tubular (10); a bonding agent is introduced through inlet ports (5) in a surface of the fiber-reinforced resin shell (1) to fill a cavity between the shell (1) and the surface of the tubular (10), and the bonding agent is cured.

29 Claims, 2 Drawing Sheets

(51) Int. Cl.
| | |
|---|---|
| *B29C 45/14* | (2006.01) |
| *B29C 45/16* | (2006.01) |
| *B29C 70/02* | (2006.01) |
| *B29C 70/68* | (2006.01) |
| *B32B 37/12* | (2006.01) |
| *B32B 37/16* | (2006.01) |
| *B29L 23/00* | (2006.01) |
| *B29K 105/08* | (2006.01) |
| *B29K 509/02* | (2006.01) |
| *B29K 509/04* | (2006.01) |
| *B29L 9/00* | (2006.01) |

(52) U.S. Cl.
CPC ............... *B32B 37/16* (2013.01); *E21B 17/10* (2013.01); *E21B 17/1042* (2013.01); *E21B 17/1085* (2013.01); *B29K 2105/0854* (2013.01); *B29K 2509/02* (2013.01); *B29K 2509/04* (2013.01); *B29L 2009/00* (2013.01); *B29L 2023/22* (2013.01); *B32B 2305/08* (2013.01); *B32B 2597/00* (2013.01); *Y10T 156/10* (2015.01)

(56) References Cited

U.S. PATENT DOCUMENTS

| | | | | |
|---|---|---|---|---|
| 5,697,442 | A | * | 12/1997 | Baldridge ............... E21B 21/10 166/177.4 |
| 5,979,508 | A | | 11/1999 | Cherrington |
| 2007/0284037 | A1 | | 12/2007 | Buytaert |
| 2010/0059218 | A1 | * | 3/2010 | Whitelaw ................... 166/241.1 |
| 2011/0114338 | A1 | * | 5/2011 | Casassa et al. ................ 166/382 |
| 2012/0186808 | A1 | | 7/2012 | Lively et al. |
| 2012/0292043 | A1 | * | 11/2012 | Thornton ...................... 166/369 |
| 2014/0367085 | A1 | * | 12/2014 | Levie et al. ................ 166/241.1 |

FOREIGN PATENT DOCUMENTS

| | | |
|---|---|---|
| GB | 2 406 591 | 4/2005 |
| GB | 2431664 | 5/2007 |
| WO | 02/04781 | 1/2002 |
| WO | 2004/015238 | 2/2004 |

OTHER PUBLICATIONS

Combined Search and Examination Report dated Feb. 5, 2014 from GB Application No. 1215868.9, pp. 1-2.

* cited by examiner

MODIFIED TUBULAR

CROSS-REFERENCE TO RELATED APPLICATIONS

This application is a U.S. National Stage application of PCT/EP2013/057416 filed 9 Apr. 2013, which claims priority to Great Britain patent application 1215868.9 filed 5 Sep. 2012, the entire disclosures of which are hereby incorporated herein by reference in their entireties.

BACKGROUND

Oil and gas reservoirs may be exploited by tapping the resources therein via wellbores. Drilling of wellbores may require drilling a considerable distance into the earth. Many oil & gas bearing formations are at sub-sea locations. The direction of drilling may vary from a vertical position to a horizontal position. The wellbore created by drilling may be stabilised by use of casing or lining or by other measures. Tubular bodies (hereinafter "tubulars") may be positioned in the wellbore. The tubular bodies may be cemented into position. The positioning of tubulars in the wellbore may be complicated by variations in wellbore direction. Tubulars may have mechanical components mounted thereon for the purposes of improving alignment and stable positioning of the tubulars in the wellbore. Correct positioning of the tubulars permits cementing to a satisfactory standard.

SUMMARY

A positioning member may be formed and applied to a tubular. The forming process may comprise prefabrication of an outer part followed by application and bonding of the outer part to the tubular. The formed positioning member provides a protrusion upon the surface of the tubular.

The positioning member may comprise a shell configured to a desired external shape. The external shape of the shell may be configured to form straight, curved, helical or spiral shaped positioning members. The shell may have an external contact or bearing surface, which may be generally planar or outwardly curved (convex), with bevelled side surfaces. The shell may have peripheral edges including portions adapted to allow passage of a flowable material. The peripheral edge portions may be indented, recessed, notched, serrated, apertured, crenulated, slotted or otherwise include a discontinuity which may form a flow port when the peripheral edge is presented against a parallel surface. The depth of the shell is selected to provide a clearance or spaced position from a surface such as the wall of a borehole.

The interior surface of the shell may be configured to provide a plurality of projections, curved ridges, a fish scale pattern or any other relief pattern.

The shell may be structurally reinforced by provision of one or more strengthening members. The strengthening member may be a strut, brace, a rib or an equivalent thereof. Such structural reinforcement may extend between two opposite sides of the shell.

The shell may be formed from a composite material. The composite material may be a fibre-reinforced resin material (FRP/GRP/GFK type material). The resin material is a hard-enable resin optionally including curing agents and curing modifiers. The resin may be self-curing, or provided in two components which harden when brought together. The two component system may be a matrix-forming (pre-polymer) component and a hardener. Suitable resins include epoxy resins, polyurethanes and polyurea resins including blends or hybrids thereof, and other curable resin components including polyester or polyol or polyamine components. The curing of the resin may be controlled by use of amine curing agents such as polyetheramines. Other additives may be present.

The fibre-reinforced resin material may be surface treated before moulding of the shell. The fibre-reinforced resin material may have a ceramic particulate applied.

The fibre-reinforced material may have a friction-modifying material applied. A combination of such surface treatments may be used. The surface treatment may be a surface modifying finish to an external surface of the moulded shell.

Additional particulate materials may be present within the bulk of the fibre-reinforced resin material. The particulates may be in bead form.

The shell may have at least one inlet for passage of flowable materials, such as bonding agents. The shell may be bonded to an external surface of a tubular. Bonding agents may be introduced into a void between the tubular and the shell by injection through the at least one inlet.

The shell may be temporarily located upon a tubular, prior to introducing bonding agents into the shell, using temporary fastenings so as to enclose a void between the tubular and the shell. The temporary fastenings may be a contact adhesive or releasable fasteners which may include ties, wires, straps, an adhesive tape and various combinations thereof.

Embodiments incorporate the disclosed summary features individually or in a variety of combinations.

DETAILED DESCRIPTION OF EMBODIMENTS

Manufacture of Shell:

In an embodiment, a permanent mould or form is designed and constructed according to shape requirements for the shell form to be manufactured, that is, the geometry required for the intended positioning member. The shape requirements are derived from known dimensions of a tubular and its intended use in a wellbore. A choice can be made amongst protrusions of straight, curved or spiral or helical configurations. A number of differing moulds may be produced to enable a variety of positioning members to be manufactured at will.

The mould is used to form materials into a prefabricated shell which is suitable to form part of a positioning member which is to be provide on a tubular.

In an embodiment, a fibre mat is infused with a resin matrix. This is achievable by passing the fibre mat through a bath containing the resin matrix. Infusion may also be achievable in other ways, such as applying the resin matrix liberally to the fibre mat by pouring or spraying or by a pressure treatment to soak, or impregnate the fibre mat with the resin matrix.

Ceramic particulates, for example hard wearing materials such as a combination of zirconium dioxide and silicon nitride, optionally in bead form, may be applied to the resin matrix infused fibre mat.

A friction modifying material such as fluorocarbon particulates providing a low friction coefficient also may be applied to the resin matrix infused mat.

The resin matrix infused fibre mat may be introduced to the mould such that surfaces treated with the aforesaid particulates are adjacent to the mould surfaces. Multiple additional layers of the resin matrix infused fibre mat, which may or may not each have been treated with particulates, may be laid up into the mould on to the first resin matrix infused fibre mat lining the mould until a predetermined thickness is attained.

Then the mould may be closed.

A resin filler matrix may be introduced into the mould using a low pressure resin transfer moulding process. In an example of such a process, a mixed resin and catalyst or resin curing agent are introduced, for example by injection, into a closed mould containing a resin matrix infused fibre and particulates lay up. In this way a composite shell may be formed.

The mould may be heated in order to achieve first cure.

After sufficient curing of the resin to permit handling of the shell, the mould can be opened and the formed shell removed.

If necessary a post cure of the formed shell may be carried out. Post cure may be a heat treatment, for example conducted in an oven.

Figure 2:
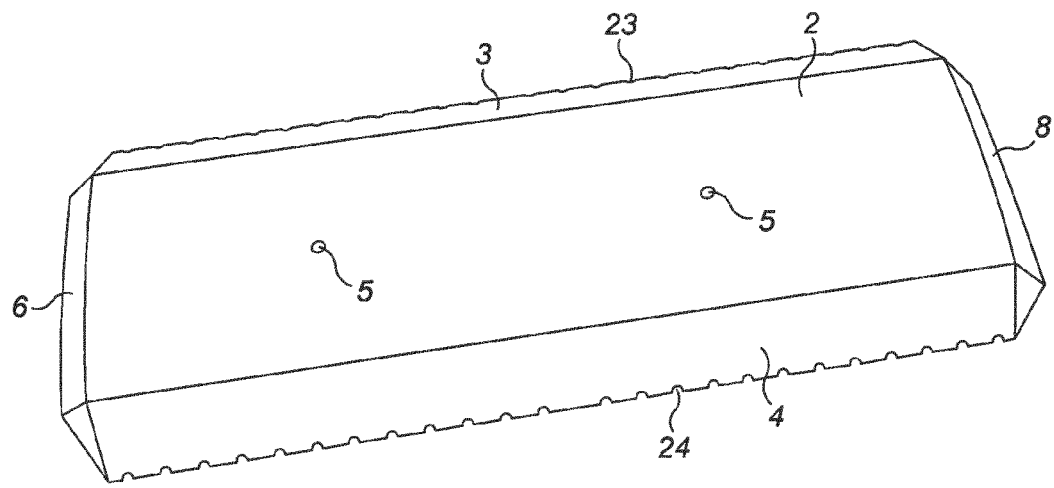
FIG. 2 is a perspective view form above and to one side of a fibre reinforced composite shell body.
Figure 3:
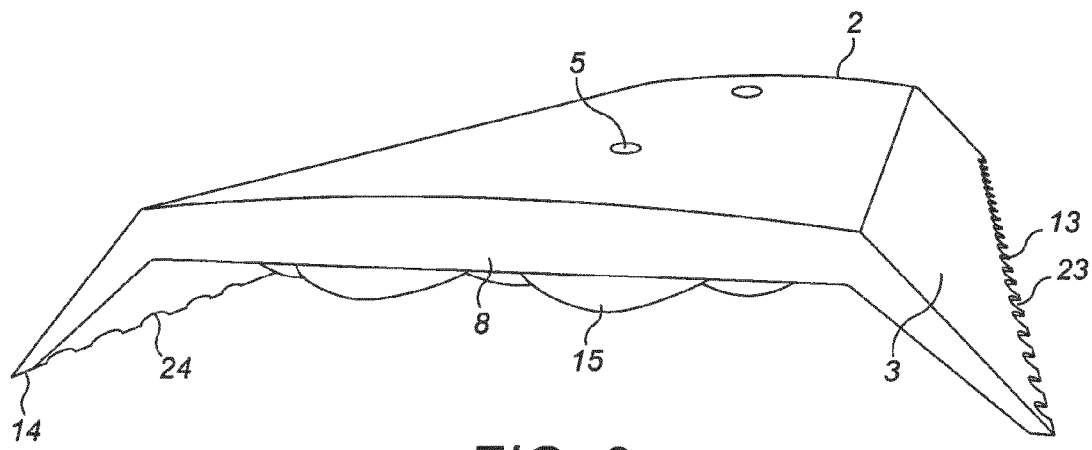
FIG. 3 is a perspective view from one end of a fibre reinforced composite shell body.
Figure 4:
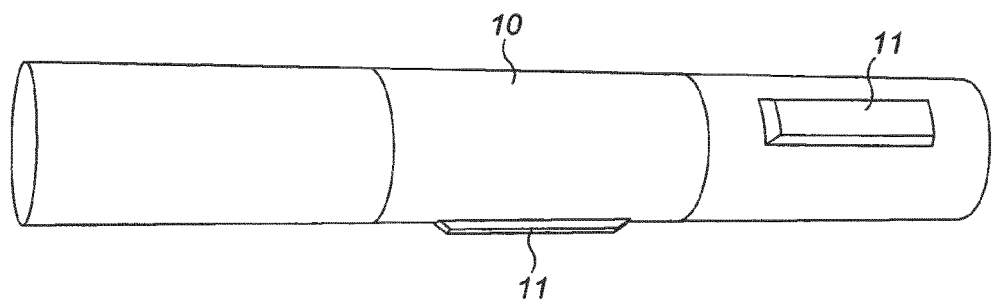
FIG. 4 is a side view of a tubular modified by application of fibre reinforced composite shell bodies.

Technical features of the Shell:

Referring to FIG. 2, an embodiment of the shell 1 has an outer contact or bearing surface 2 which is generally planar with peripheral sloping or bevelled sides 3, 4 and ends 6, 8. Other embodiments may have a convex curved bearing surface or faceted contour surface. The outer bearing surface 2 is provided with injection inlet ports 5.

Figure 1:
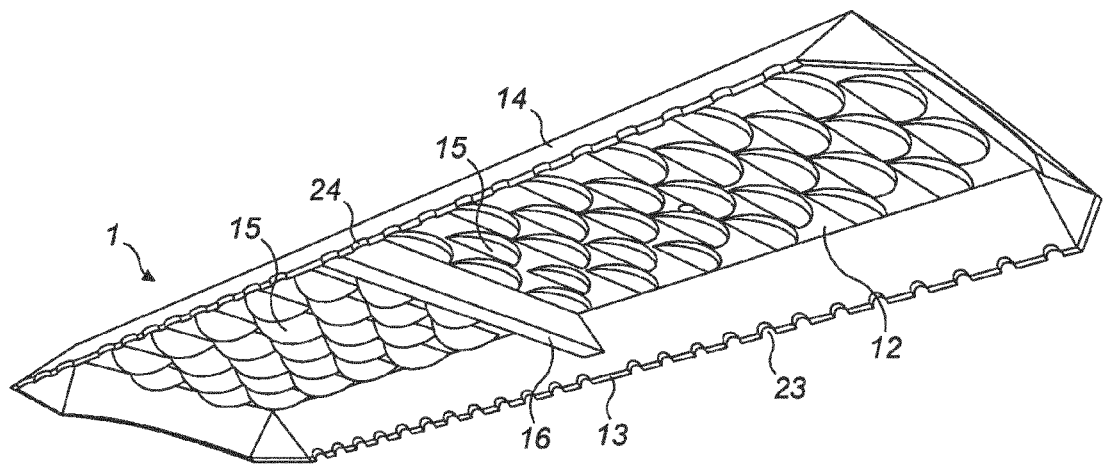
FIG. 1 is a perspective view from below and to one side of a fibre reinforced composite shell body.

Referring to FIG. 1, the shell has peripheral edges 13, 14 adapted to allow passage of a flowable material. Provision of recesses 23, 24 in portions of the peripheral edges 13, 14 provides a series of apertures when the peripheral edges 13, 14 are in contact with a parallel surface.

Referring to FIG. 1, an inner surface 12 of the shell 1 is configured to provide a plurality of curved ridges 15, or fish scale pattern, to provide a keying surface to improve adhesion or bonding with a bonding material.

Optionally, the shell is formed to include structural reinforcements such as one or more integral strengthening struts, braces or ribs 16 extending from one side 3 to an opposite side 4. One such transverse strut 16 is shown in FIG. 1.

Modification of a Tubular

In use of the shell 1 to form a positioning member 11, a selected outer surface area of a tubular 10 is prepared in order to provide a clean, dry substrate with an appropriate surface profile for receiving the shell.

A prefabricated shell 1 of appropriate dimensions is presented to the prepared area, so that edges 13 and 14 are contiguous with the surface of the tubular. The shell 1 is held in position temporarily by use of releasable fastenings such as removable straps, or adhesive tape. A cavity is thereby defined between interior surfaces of the shell 1 and the prepared area of the tubular.

A bonding material is injected into the shell cavity through one or more inlet ports 5 in the surface of the shell 1 until it flows through the apertures defined between the recesses 23, 24 and the surface of the tubular.

When a period sufficient for curing of the bonding material has elapsed, the straps and/or adhesive tape may be removed.

By this method the prefabricated shell becomes an integral part of the positioning member bonded to the tubular.

The tubular is thereby modified to have a surface mounted positioning member which facilitates appropriate positioning of the tubular in a borehole.

Additional positioning members may be formed on the tubular by repetition of the above described methods and procedures.

Variations, modifications of the disclosed embodiments contemplated by the person skilled in the field are within the scope of the disclosure, and with regard to scope, attention is directed to the following claims which form part of the present disclosure and extend to all equivalents of the disclosed subject matter.

The invention claimed is:

1. A positioning member for attachment to a tubular, the positioning member comprising:
   a shell having ends and sides, wherein the ends are each adjacent to at least one of the sides; and
   a bonding material that bonds the shell to the tubular, the bonding material being disposed in a shell cavity defined at least partially by the ends and sides of the shell and a surface of the tubular, wherein the bonding material substantially fills an interior of the shell.

2. The positioning member claimed in claim 1, wherein the shell is formed from a composite material and has a surface comprising particulates conferring surface abrasion resistance properties.

3. The positioning member claimed in claim 1, wherein the shell is formed from a composite material and has a surface comprising particulates conferring low friction coefficient properties.

4. The positioning member claimed in claim 1, wherein the shell is formed from a composite material and has a surface comprising particulates conferring surface abrasion resistance and particulates conferring low friction coefficient properties.

5. The positioning member claimed in claim 1 wherein the shell comprises a fibre reinforced mat infused with a resin matrix, and the fibre reinforced mat infused with a resin matrix has ceramic particulates on at least a surface thereof.

6. The positioning member claimed in claim 5, wherein the fibre reinforced mat infused with a resin matrix has friction reducing fluorocarbon particulates on at least a surface thereof.

7. The positioning member claimed in claim 5, wherein particulate materials are provided within the fibre reinforced mat infused with a resin matrix.

8. The positioning member claimed in claim 7, wherein the particulate materials provided within the fibre reinforced mat infused with a resin matrix are selected from the group consisting of particulates conferring surface abrasion resistance and particulates conferring low friction coefficient properties.

9. The positioning member claimed in claim 1, wherein the shell comprises ceramic beads on at least one outer surface thereof.

10. The positioning member claimed in claim 9, wherein the ceramic beads comprise zirconium dioxide and silicon nitride.

11. The positioning member claimed in claim 1, wherein the shell has an external planar bearing surface and bevelled side surfaces.

12. The positioning member claimed in claim 1, wherein the shell has an external convex curved bearing surface and bevelled side surfaces.

13. The positioning member as claimed in claim 1, wherein the shell comprises an outer wall connected with each of the ends and the sides, wherein the ends and sides extend radially away from the surface of the tubular, and wherein the shell cavity is defined at least partially by the outer wall, the ends, and the sides, such that the shell cavity, and the bonding material therein, extend to a radial position that is radially outward of an inner edge of the shell.

14. The positioning member as claimed in claim 1, wherein the ends face at least partially axially along the tubular and the sides face at least partially in a circumferential direction of the tubular.

15. A method comprising:
forming composite materials into a shell having an external bearing surface, ends, and bevelled sides, wherein each of the ends is adjacent to at least one of the sides, and wherein the composite materials comprise fibre-reinforced resins and particulates selected from the group consisting of particulates conferring surface abrasion resistance and particulates conferring low friction coefficient properties;
positioning the shell on a tubular; and
after positioning the shell, introducing a bonding material to a shell cavity defined at least partially by the ends and sides of the shell and a surface of the tubular, wherein the bonding material bonds the shell to the tubular, and wherein the bonding material substantially fills an interior of the shell.

16. The method claimed in claim 15, wherein the shell has edge portions adapted to allow passage of a flowable material.

17. The method claimed in claim 15, wherein an interior surface of the shell comprises a plurality of projections.

18. The method claimed in claim 15, wherein an interior surface of the shell comprises a plurality of curved ridges.

19. The method claimed in claim 15, wherein an interior surface of the shell comprises a relief pattern.

20. The method claimed in claim 15, wherein an interior surface of the shell comprises a structural reinforcement.

21. The method claimed in claim 20, wherein the structural reinforcement comprises at least one strengthening member extending between two opposite sides of the shell.

22. The method claimed in claim 21, wherein the at least one strengthening member is at least one member selected from the group consisting of a strut, a brace and a rib.

23. The method claimed in claim 15, wherein the shell has a geometry selected from the group consisting of straight, curved, helical and spiral configurations.

24. The method claimed in claim 15, wherein the shell includes at least one inlet port for passage of flowable materials.

25. A method for forming a positioning member on a tubular, comprising:
applying a prefabricated composite shell to a surface of the tubular, wherein the prefabricated composite shell comprises sides and ends, wherein each side is adjacent to at least one of the ends;
introducing bonding material to a cavity defined at least partially by the ends and the sides of the shell and the surface of the tubular, wherein the bonding material substantially fills an interior of the prefabricated shell; and
curing the bonding material, wherein the cured bonding material bonds the prefabricated shell to the tubular.

26. The method claimed in claim 25, wherein the prefabricated composite shell has an external surface comprising particulates selected from the group consisting of particulates conferring surface abrasion resistance and particulates conferring low friction coefficient properties.

27. A method for forming a positioning member on a tubular, comprising:
applying a prefabricated composite shell to a surface of the tubular, wherein the prefabricated composite shell comprises sides and ends, wherein each side is adjacent to at least one of the ends;
introducing bonding material to a cavity defined at least partially by the ends and the sides of the shell and the surface of the tubular, wherein introducing the bonding material comprises injecting the bonding material through one or more holes defined in the shell; and
curing the bonding material, wherein the cured bonding material bonds the prefabricated shell to the tubular.

28. A method for forming a positioning member on a tubular, comprising:
applying a prefabricated composite shell to a surface of the tubular, wherein the prefabricated composite shell comprises sides and ends, wherein each side is adjacent to at least one of the ends;
introducing bonding material to a cavity defined at least partially by the ends and the sides of the shell and the surface of the tubular, wherein introducing the bonding material comprises causing the bonding material to flow through one or more of a plurality of apertures formed in an edge of the shell, the edge contacting the surface of the tubular between the plurality of apertures; and
curing the bonding material, wherein the cured bonding material bonds the prefabricated shell to the tubular.

29. A positioning member for attachment to a tubular, the positioning member comprising:
a shell having ends and sides, wherein the ends are each adjacent to at least one of the sides; and
a bonding material that bonds the shell to the tubular, the bonding material being disposed in a shell cavity defined at least partially by the ends and sides of the shell and a surface of the tubular,
wherein at least one of the sides of the shell comprises an edge that is contiguous with the surface of the tubular, the edge defining apertures therein, and the bonding material being disposed in at least some of the apertures.

* * * * *